US010234094B2

(12) United States Patent
Orisich et al.

(10) Patent No.: US 10,234,094 B2
(45) Date of Patent: Mar. 19, 2019

(54) LIGHTING DEVICE FOR PRODUCING A SUPPLEMENTAL BEAM

(71) Applicant: Valeo North America, Inc., Seymour, IN (US)

(72) Inventors: John Steven Orisich, Columbus, IN (US); Brant James Potter, Columbus, IN (US)

(73) Assignee: Valeo North America, Inc., Seymour, IN (US)

( * ) Notice: Subject to any disclaimer, the term of this patent is extended or adjusted under 35 U.S.C. 154(b) by 117 days.

(21) Appl. No.: 15/263,580

(22) Filed: Sep. 13, 2016

(65) Prior Publication Data

US 2018/0073698 A1 Mar. 15, 2018

(51) Int. Cl.

| | |
|---|---|
| ***B60Q 1/18*** | (2006.01) |
| ***F21S 41/20*** | (2018.01) |
| ***G02B 27/30*** | (2006.01) |
| ***F21S 41/141*** | (2018.01) |

(52) U.S. Cl.

CPC ........... *F21S 41/285* (2018.01); *F21S 41/141* (2018.01); *B60Q 1/18* (2013.01); *G02B 27/30* (2013.01)

(58) Field of Classification Search

None

See application file for complete search history.

(56) References Cited

U.S. PATENT DOCUMENTS

| | | | | |
|---|---|---|---|---|
| 7,153,000 | B2 * | 12/2006 | Park | H01L 33/54 362/268 |
| 8,157,427 | B2 | 4/2012 | Mochizuki et al. | |
| 8,562,192 | B2 | 10/2013 | Tatara | |
| 8,670,424 | B2 | 3/2014 | Park et al. | |
| 2009/0231867 | A1 | 9/2009 | Mochizuki et al. | |
| 2009/0279317 | A1 | 11/2009 | Tatara | |
| 2010/0118531 | A1 * | 5/2010 | Montagne | G02B 27/0955 362/235 |
| 2011/0267823 | A1 * | 11/2011 | Angelini | F21L 4/027 362/277 |
| 2013/0021812 | A1 * | 1/2013 | Schug | F21S 41/143 362/487 |
| 2013/0207543 | A1 | 8/2013 | Tatara | |
| 2014/0307459 | A1 * | 10/2014 | Brendle | F21S 41/143 362/520 |
| 2017/0030542 | A1 * | 2/2017 | Gromfeld | F21S 48/1241 |
| 2017/0130923 | A1 * | 5/2017 | Nishimura | F21S 48/1291 |

FOREIGN PATENT DOCUMENTS

| | | |
|---|---|---|
| EP | 2196727 | 6/2010 |
| EP | 2196727 A1 | 6/2010 |

* cited by examiner

*Primary Examiner* — Britt D Hanley

(74) *Attorney, Agent, or Firm* — Oblon, McClelland, Maier & Neustadt, L.L.P.

(57) ABSTRACT

A vehicle lighting system that projects a primary beam and that comprises a supplemental or auxiliary beam that augments the primary beam that does not exceed any regulatory maximum intensity values. In one embodiment, the lighting system utilizes a multi-lobed lens adapted to distribute light to predetermined areas of the primary beam. A combined beam is created having no portion that exceeds the regulatory maximum intensity. In one illustrative embodiment, the primary beam is a high beam and the combined beam is an augmented primary beam that does not exceed the high beam regulatory limit of 75,000 candelas.

17 Claims, 19 Drawing Sheets

LIGHTING DEVICE FOR PRODUCING A SUPPLEMENTAL BEAM

BACKGROUND OF THE INVENTION

1. Field of the Invention

This invention relates to a lighting device for producing a supplemental beam, particularly, a supplemental high beam.

2. Description of the Related Art

In the past, vehicles have been provided with headlamp assemblies that produce multiple beam functions, such as low beam and high beam functions. In some vehicle markets, high beams are limited to a maximum intensity by governmental regulatory authorities. A typical high intensity lighting device for a SAE supplemental high beam market have been designed using high luminous, high output LED, such as a laser LED, and imaging systems. Because the maximum high beam output is limited to, for example, 75,000 candelas, the use of supplemental high beam lamps that add additional light to the high beam is of limited benefit because the combination of a supplemental beam with a high beam cannot exceed the 75,000 candelas limit.

Some prior art lighting systems, such as adaptive driving beam (ADB) headlamp systems, may be considered to supplement the high beam, but these systems were typically complex mechanisms and sophisticated, sometimes requiring pixel switching or other mechanisms that were necessary to supplement the high beam. Many of these systems were not specific or subject to the current SAE high beam regulations.

What is needed, therefore, is a lighting system that overcomes one or more of the problems of the prior art and that produces a complementary distribution to a high beam, while staying under the regulatory maximum intensity.

SUMMARY OF THE INVENTION

One object of one embodiment of the invention is to provide a lighting system that has a high performance high beam without exceeding regulatory limits, such as SAE H-V limits of 75,000 candelas.

Another object of one embodiment of the invention is to provide a new and improved design of a supplemental pattern for a high beam.

Still another object of one embodiment of the invention is to produce a higher performance beam, such as a high beam, without exceeding regulatory limits, such as regulatory high beam limits.

Yet another object of one embodiment of the invention is to provide a lighting device that does not rely on complex optical designs.

Another object of one embodiment of the invention is to provide a lighting system that has an optical system that produces a complementary distribution that can be combined with a main or primary beam, such as a high beam, and that would add less light at predetermined areas of the beam, but more light to other areas of the beam, such as more light at higher horizontal angles in order to increase the intensity of the primary beam at those particular areas while not exceeding any legal or regulatory maximums, such as the 75,000 candelas maximum mentioned earlier herein.

In one aspect, one embodiment of the invention comprises a vehicle lighting device which projects a primary beam having a maximum intensity portion having a predetermined maximum intensity, said vehicle lighting device comprising a supplemental lighting system comprising at least one light source for providing at least one second beam, and at least one lens which receives said at least one second beam and transmits a complementary beam in response thereto; wherein said complementary beam becomes combined with and supplements said primary beam to provide a supplemented beam pattern wherein said maximum intensity portion is not increased above said predetermined maximum intensity after said supplemental beam pattern is created.

In another aspect, one embodiment of the invention comprises a vehicle lighting device able to project a main beam having a maximum intensity portion, said maximum intensity portion having a predetermined maximum intensity, said vehicle lighting device comprising at least one supplemental lighting system comprising at least one light source, at least one shaping lens configured to receive light from said at least one light source and to shape said received light in a supplemental beam; wherein said supplemental beam is simultaneously projected and combined with said main beam to provide an overall beam pattern wherein said maximum intensity portion is equal to or less than said predetermined maximum intensity.

In another aspect, another embodiment of the invention comprises a lens for use in a vehicle lighting device, said lens having an axis, comprising a lens body; and said lens body having an entry face and at least one convex exit face that is convex with respect to said entry face, said entry face is arranged to receive light from at least one light source and to generate a plurality of beams through said at least one convex face.

In another aspect, another embodiment of the invention comprises a complementary lighting device having an optical axis, comprising at least one light source; and at least one lens having at least one convex face which receives light from said at least one light source and projects a plurality of beams through said at least one convex face.

In still another aspect, another embodiment of the invention comprises an auxiliary lighting device comprising at least one lens having an optical axis, an input face and at least one convex exit face, a first light source, at least one second light source laterally displaced from said first light source at a different location than a location of said first light source relative to said optical axis, and a housing which supports said at least one lens, said first light source and said at least one second light source.

In yet another aspect, another embodiment of the invention comprises a lens for use in a vehicle lighting device, said lens having an axis, comprising a lens body, and said lens body having an entry face and at least one convex exit face, said entry face receiving light from at least one light source and generating a plurality of beams through said at least one convex face.

This invention, including all embodiments shown and described herein, could be used alone or together and/or in combination with one or more of the following list of features:

- The vehicle lighting device wherein an exit surface of the lens comprises multiple lobes.
- The vehicle lighting device as recited in claim 2, wherein said multiple lobes comprises a first generally convex surface and a second generally convex surface, wherein said first and second generally convex surfaces are convex relative to at least one entry surface of said at least one shaping lens that receives said received light.
- The vehicle lighting device wherein the first and second generally convex surfaces are symmetrical about a medial line.
- The vehicle lighting device wherein the first and second generally convex surfaces are not strictly concave.

The vehicle lighting device wherein the first and second generally convex surfaces each having increasing slopes as they approach a medial line of the lens.

The vehicle lighting device wherein the at least one light source and the lens cooperate to generate at least two diverging beams that straddle the primary beam and that do not augment a predetermined area of the primary beam.

The vehicle lighting device wherein the at least one light source and the at least one lens cooperate to generate the complementary beam having at least two diverging beams that straddle the maximum intensity portion of the primary beam and that do not augment a predetermined area of the primary beam The vehicle lighting device wherein the maximum intensity of each of the at least two diverging beams does not exceed 75 percent of a maximum intensity of the primary beam.

The vehicle lighting device wherein the predetermined area is an area of highest intensity of the primary beam before it is combined with the complementary beam.

The vehicle lighting device wherein the at least two diverging beams diverge at an angle of between about 8-12 degrees.

The vehicle lighting device wherein the at least one light source comprises an LED and a beam splitter or light guide that generates the at least two diverging beams.

The vehicle lighting device wherein the at least one light source comprises a collimator which collimates the light of the at least one light source.

The vehicle lighting device wherein the at least one light source comprises a plurality of LEDs.

The vehicle lighting device in which the lens is an integral monolithic construction of poly methyl methacrylate (PMMA).

The vehicle lighting device in which the lens is an integral monolithic construction.

The complementary lighting device wherein an exit surface of the at least one lens comprises multiple lobes.

The complementary lighting device wherein the multiple lobes comprises a first generally convex surface and a second generally convex surface.

The complementary lighting device wherein the first and second convex surfaces are symmetrical about a medial line.

The complementary lighting device which, when installed adjacent a primary headlamp which produces a primary beam in a vehicle, projects at least a first diverging beam adjacent the primary beam.

The complementary lighting device wherein the first and second generally convex surfaces are not strictly concave.

The complementary lighting device wherein the first and second generally convex surfaces each having increasing slopes as they approach a medial line of the lens.

The complementary lighting device which, when installed adjacent a primary headlamp which produces a primary beam in a vehicle, projects a first diverging beam on one side of the primary beam and a second diverging beam on an opposite side of the primary beam.

The complementary lighting device wherein the at least one light source and the at least one lens cooperate to generate at least two diverging beams that straddle the primary beam and that do not add to an intensity of a predetermined area of the primary beam.

The complementary lighting device wherein the plurality of beams comprises two diverging beams that do not exceed 75 percent of a maximum intensity of the primary beam.

The complementary lighting device wherein the predetermined area is an area of highest intensity of the primary beam before it is combined with a complementary beam.

The complementary lighting device wherein the two diverging beams diverge at an angle of between about 8-12 degrees.

The complementary lighting device wherein the at least one light source comprises an LED and a beam splitter or light guide that generates at least two diverging beams.

The complementary lighting device wherein the at least one light source comprises a collimator which collimates the light of the at least one light source.

The complementary lighting device wherein the at least one light source comprises a plurality of LEDs.

The complementary lighting device in which the lens is an integral monolithic construction of poly methyl methacrylate (PMMA).

The complementary lighting device in which the lens is an integral monolithic construction.

The auxiliary lighting device in which the lens projects two diverging light beams which diverge from each other by about 8-12 degrees.

The auxiliary lighting device which is situated adjacent to a primary headlamp on a vehicle, wherein the primary headlamp projects a primary beam and wherein the two diverging light beams straddle the primary beam.

The auxiliary lighting device in which the primary beam is subject to government regulations which place a limit on intensity of the primary beam, and the two diverging light beams do not augment the primary beam to an intensity that causes the primary beam to exceed the limit.

The auxiliary lighting device wherein an exit surface of the at least one lens comprises multiple lobes.

The auxiliary lighting device wherein the multiple lobes comprises a first generally convex surface and a second generally convex surface.

The auxiliary lighting device wherein the first and second convex surfaces are symmetrical about a medial line.

The auxiliary lighting device which is situated adjacent to a primary lighting device on a vehicle, wherein the primary lighting device projects a primary beam and wherein the at least one lens provides at least one light beam that straddles the primary beam.

The auxiliary lighting device wherein the at least one lens provides at least two diverging light beams that straddle the primary beam and cooperate with the primary beam to provide a combined beam.

The auxiliary lighting device wherein the at least two diverging light beams that straddle the primary beam are generated by selectively energizing the first light source and the at least one second light source.

The auxiliary lighting device wherein the at least one convex exit face is adapted to create the at least two diverging light beams that straddle the primary beam.

The auxiliary lighting device wherein the auxiliary lighting device is situated adjacent to a primary lighting device on a vehicle, wherein the primary lighting device projects a primary beam and wherein the at least one lens projects the two diverging light beams such that they do not increase a light intensity of at least a portion of the primary beam.

The auxiliary lighting device wherein a first curvature and a second curvature are symmetrical about the medial line and the medial line is a vertical medial line.

The auxiliary lighting device wherein at least one LED is positioned in operative relationship with a rear surface of the at least one lens, a first at least one lens face and a second at least one lens face generating a first beam pattern and a second beam pattern, the first beam pattern and the second beam pattern diverging from one another and creating an area of intensity therebetween that is lower than either of the first beam pattern or the second beam pattern.

The vehicle lighting device in which the lens has a plurality of exit faces of different focal lengths through which the two diverging beams pass.

The vehicle lighting device in which the lens has a convex face having a plurality of exit regions or lobes of different curvatures or focal lengths through which the two diverging beams pass.

The vehicle lighting device wherein the lens has a convex face having at least a first curvature and a second curvature that are symmetrical about a medial line.

The vehicle lighting device wherein the first curvature and the second curvature are symmetrical about the medial line and the medial line is a vertical medial line.

The vehicle lighting device wherein at least one LED is positioned in operative relationship with a rear surface of the lens, a first lens face and a second lens face generating a first beam pattern and a second beam pattern, the first beam pattern and the second beam pattern diverging from one another and creating an area of intensity therebetween that is lower than either of the first beam pattern or the second beam pattern.

The lens in which the at least one the at least one convex exit face comprises a plurality of exit faces of different focal lengths for generating at least one supplemental beam pattern for supplementing a separate beam pattern.

The lens in which the at least one convex exit face comprises a plurality of convex regions, lobes or curvatures for generating a plurality of beam patterns.

The lens wherein the at least one convex exit face has a first curvature and a second curvature that are symmetrical about a medial line.

The lens wherein the plurality of convex regions, lobes or curvatures comprise a first generally convex surface and a second generally convex surface that is adjacent the first generally convex surface.

The lens wherein the first and second convex surfaces are symmetrical about a medial line that generally coincides with an axis of the lens.

These and other objects and advantages of the invention will be apparent from the following description, the accompanying drawings and the appended claims.

BRIEF DESCRIPTION OF THE ACCOMPANYING DRAWINGS

Figure 14:
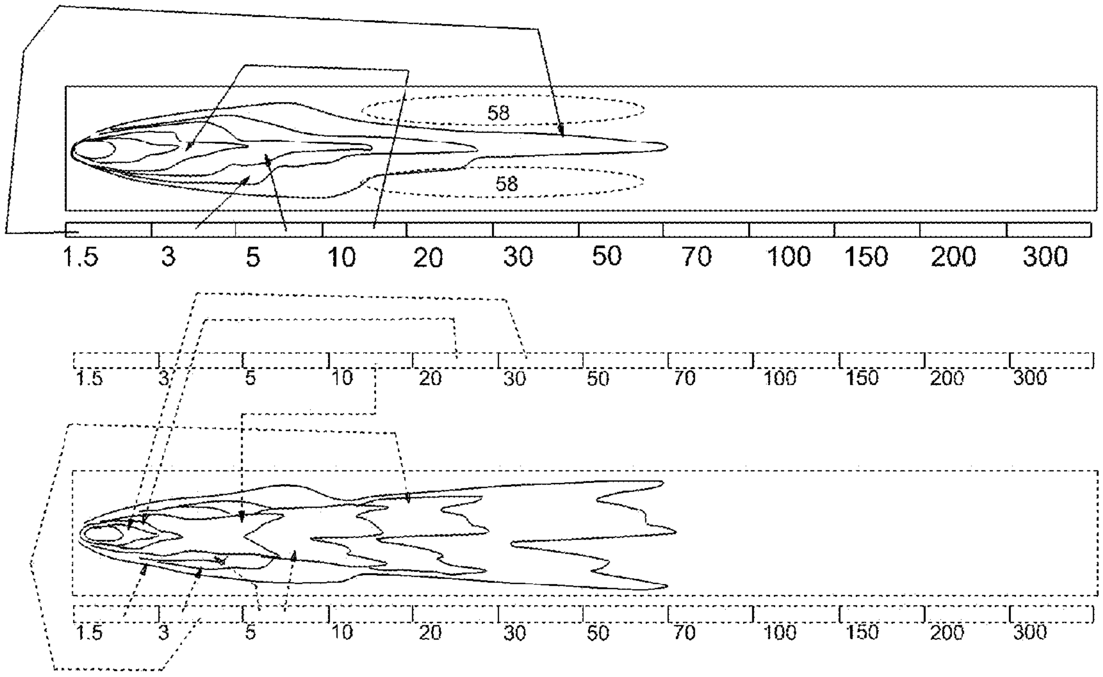
Figure 15:
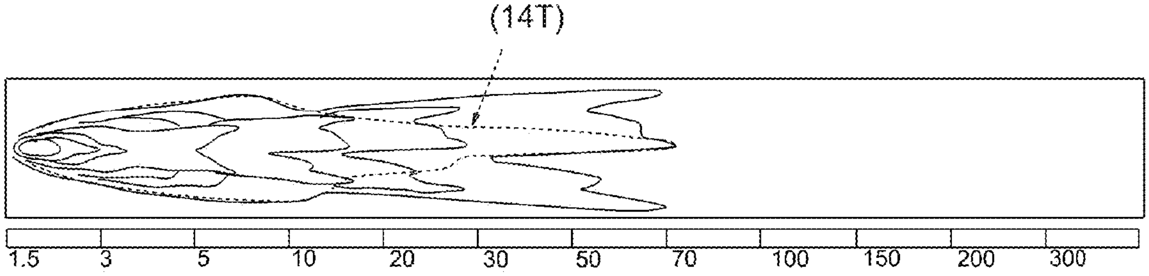
Figure 22:
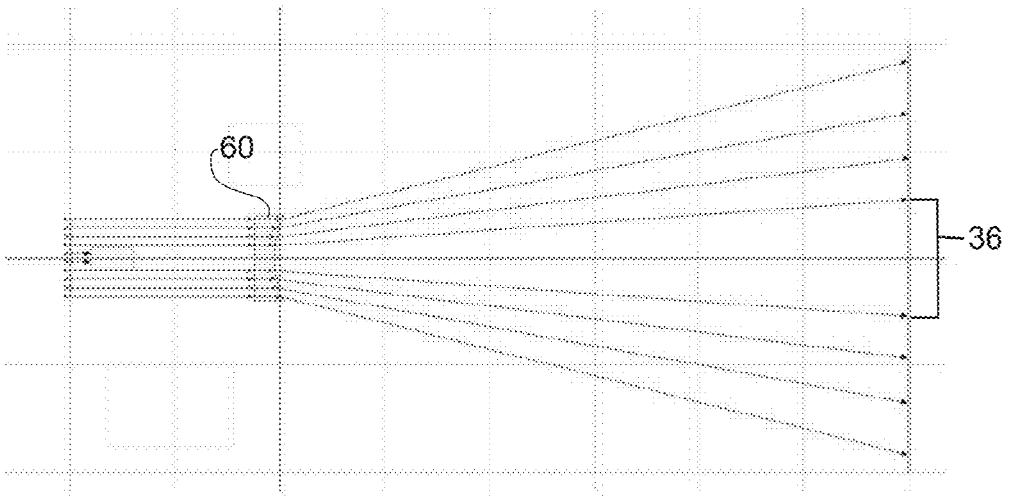
Figure 23:
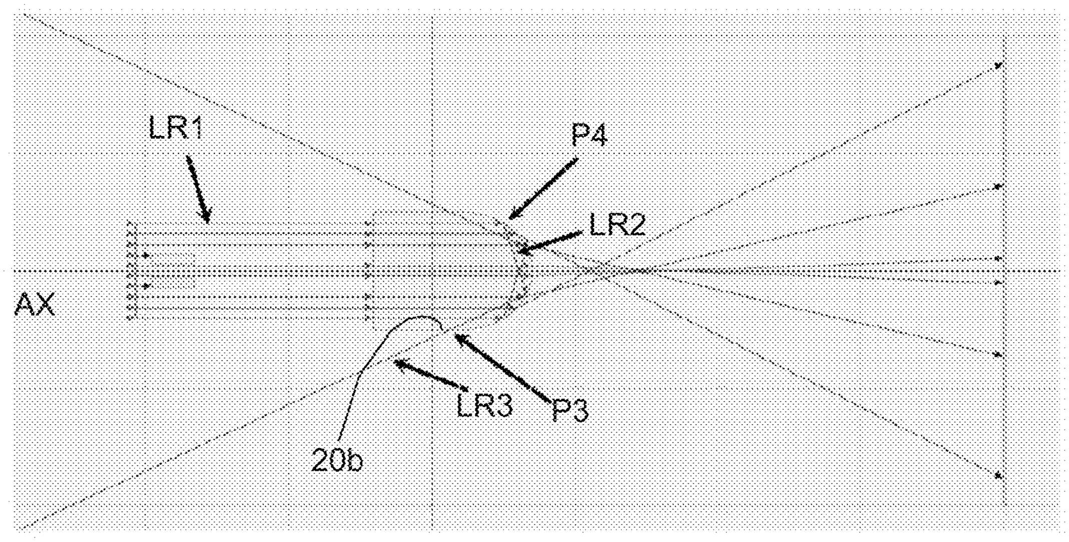
Figure 25:
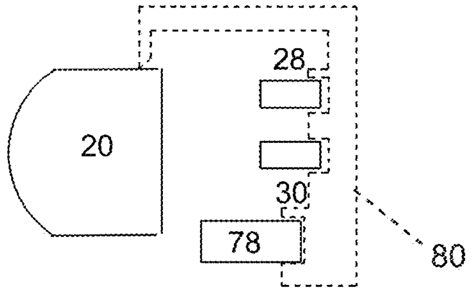
Figure 26:
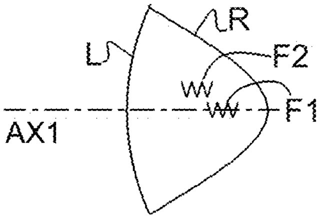
FIG. 26 Prior Art
Figure 27:
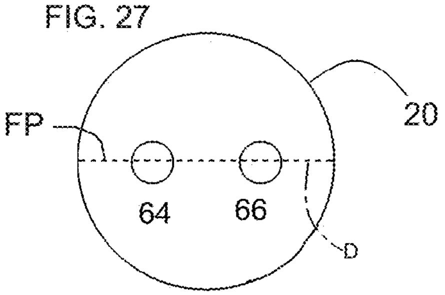
Figure 28:
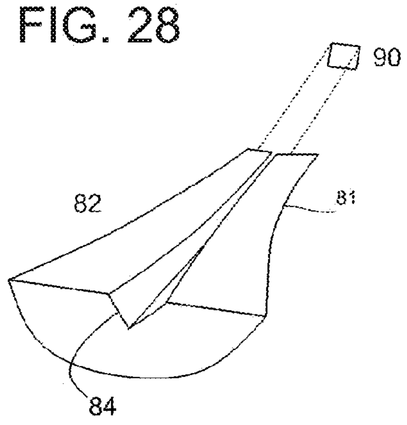
Figure 29:
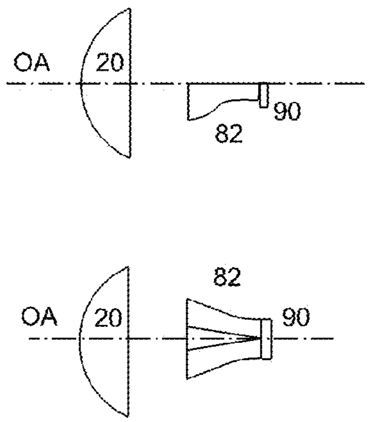
Figure 30:
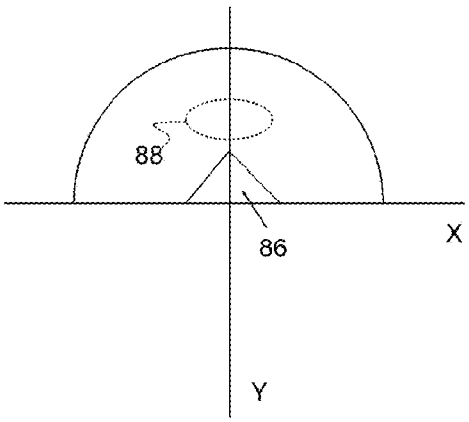
Figure 31A:
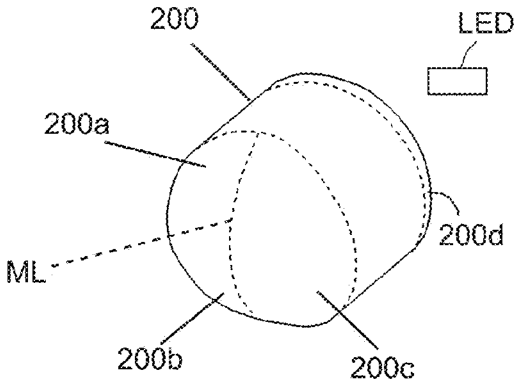
Figure 31B:
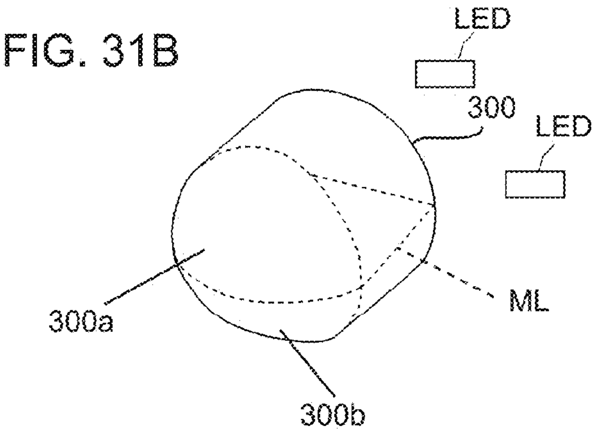
Figure 31C:
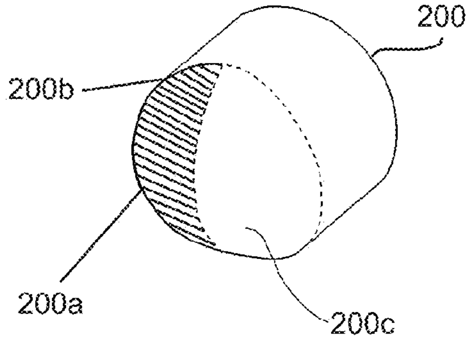
Figure 32:
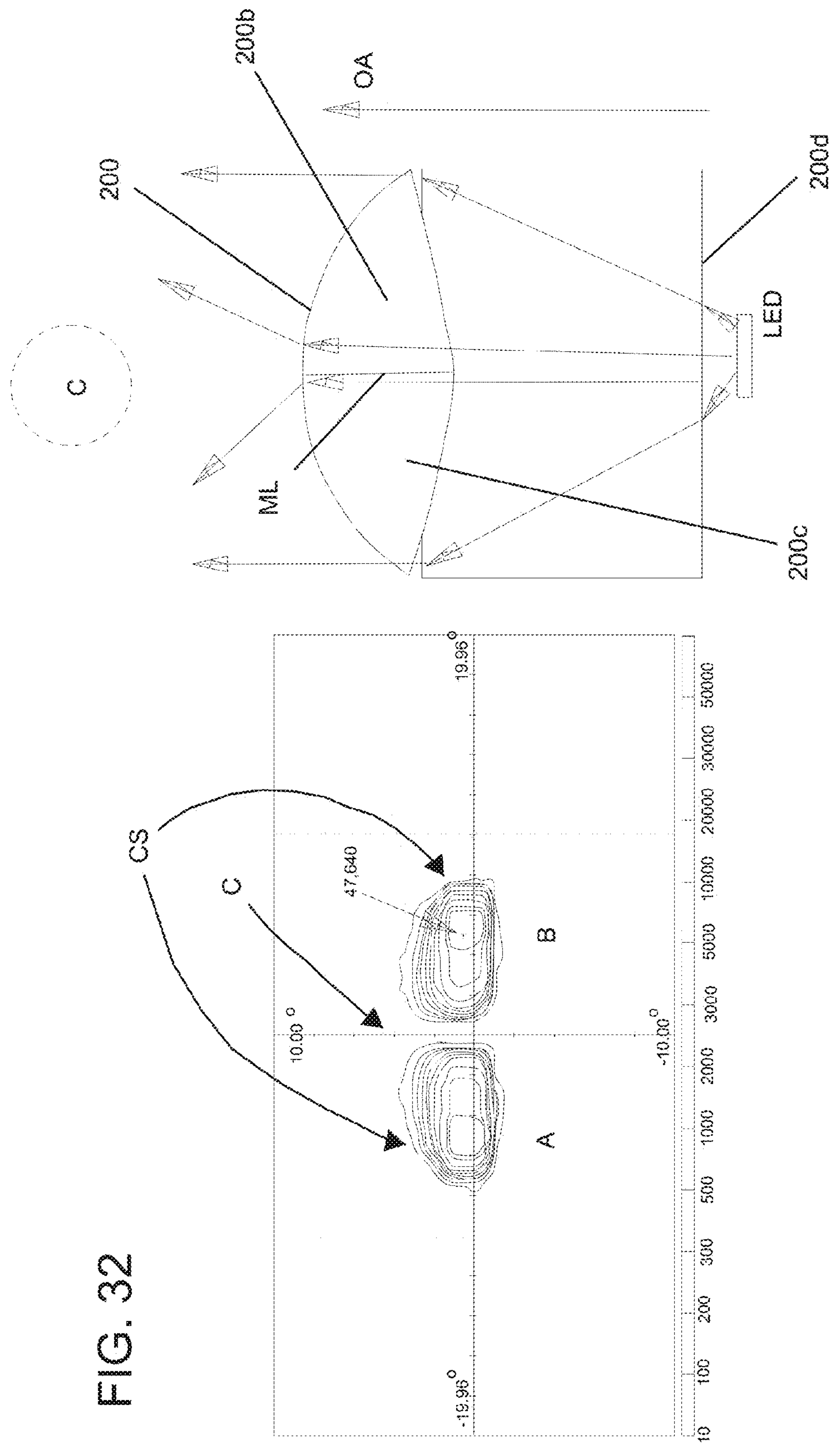
Figure 33:
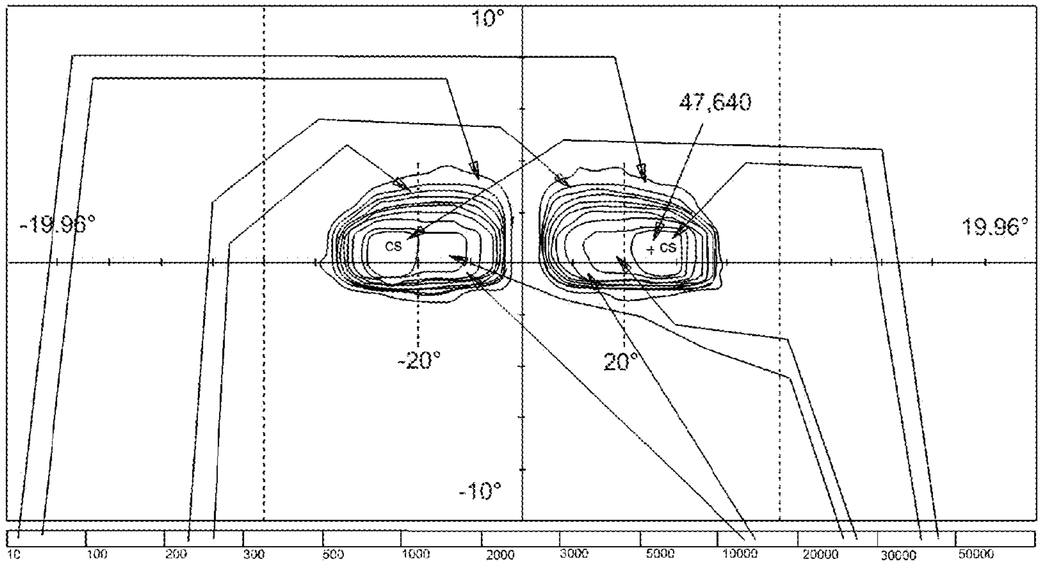
Figure 34:
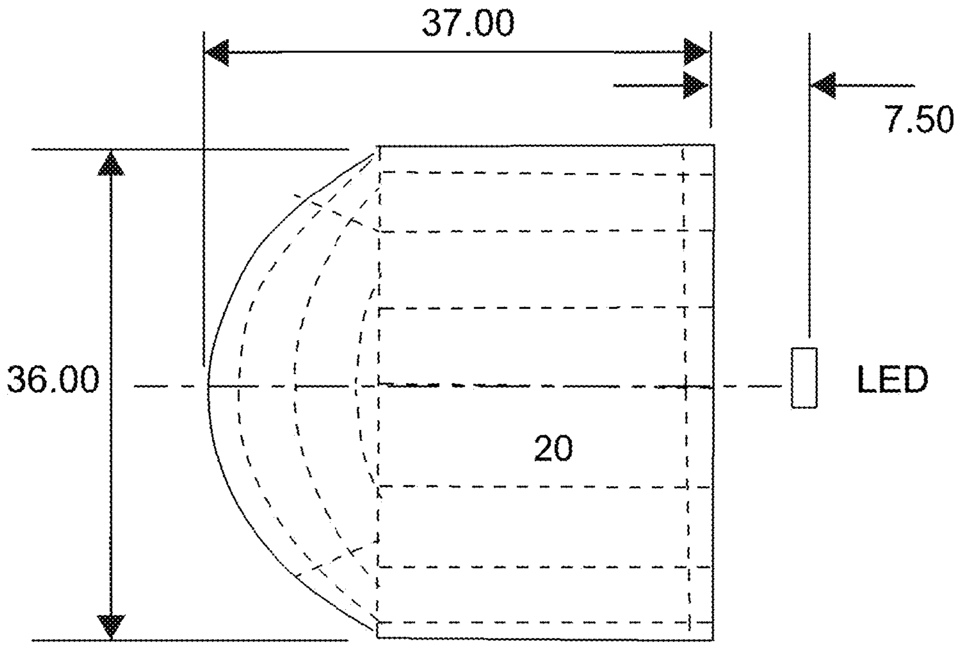
Figure 34:
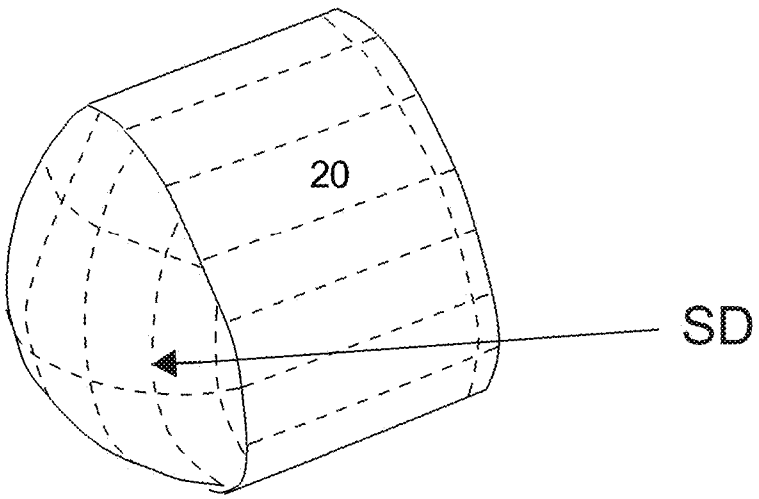

FIG. 14 compares the bird's eye view of (1) the intensity pattern of an ordinary headlamp with (2) the ordinary headlamp as augmented by one form of the invention;

FIG. 15 is a superposition of the two views in FIG. 14;

FIGS. 16, 17, 18, 19, 20, and 21 are plots produced by a public domain ray-tracing computer program, showing different patterns produced by different light sources;

FIGS. 22, and 23 are plots produced by a public domain ray-tracing computer program, showing different patterns produced by different light sources;

FIGS. 24A-24D shows various approaches to launching light beams into the lens;

FIG. 25 illustrates one form of the invention;

FIG. 26 illustrates a headlamp found in the prior art;

FIG. 27 illustrates two light sources located adjacent a horizontal diameter of the planar face of the lens;

FIGS. 28 and 29 illustrate one form of the invention;

FIG. 30 is an intensity pattern produced by the invention of FIGS. 28 and 29;

FIGS. 31A-31C illustrate another embodiment of the invention, wherein the lens has two exit faces of different curvature;

FIG. 32 illustrates the image of FIG. 33, juxtaposed with the lens showing how lens segment A produces projected light spot A, and lens segment B produces projected light spot B;

FIG. 33 is an approximate tracing of the cross-sectional intensity of one form of the invention in which the exit faces A and B of the lens in FIG. 32 have different curvature, and thus project beams of different shape; and FIG. 34 illustrates more details of the lens of FIG. 31A.

DETAILED DESCRIPTION OF THE PREFERRED EMBODIMENTS

Figure 1:
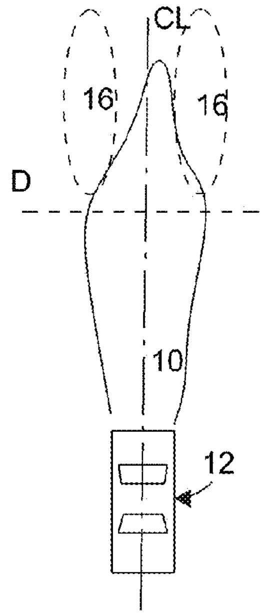
FIG. 1 Prior Art
FIG. 1 is a prior art sketch of a headlight beam of a vehicle showing poorly illuminated regions.
Figure 2:
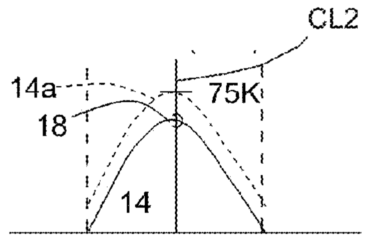
FIG. 2 Prior Art
FIG. 2 is another prior art sketch of the cross sectional intensity of the beam in FIG. 1.

FIG. 1 is a prior art view that illustrates a simplified pattern 10 of light distribution of a headlight in an ordinary motor vehicle 12. FIG. 2 is a simplified prior art representation of the cross-sectional intensity distribution 14 of the pattern 10, taken along dashed line D in FIG. 1.

It may be desired to increase the light intensity projected into regions 16 in FIG. 1, which flank the main or primary beam pattern 10. If this is done by increasing the intensity of the headlamps, then the intensity at a point P in FIG. 2 may also increase, which may be undesirable. That is, the increase in intensity may shift the entire intensity curve in FIG. 2 upward to curve 14*a* shown in phantom. However, government regulations place limits on the maximum intensity allowed on headlamps. The level labeled 75K in FIG. 2 represents such a limit, and the shifted curve 14*a* would exceed this regulated limit. In FIG. 2, the line labeled 75K represents a limit of intensity, imposed by government regulations, of 75,000 candelas at the centerline CL2 of the beam pattern.

One embodiment of the invention increases the light projected into regions 16 by using an auxiliary, supplementary or complementary headlamp beam, but without exceeding a maximum intensity, such as a maximum candela limit, such as the 75,000 candelas limit mentioned earlier. In general, the vehicle lighting device described herein is able to project a main beam having a maximum intensity portion, with the maximum intensity portion having a predetermined maximum intensity. The vehicle lighting device comprises: at least one supplemental lighting system comprising at least one light source, and at least one shaping lens configured to receive light from the at least one light source and to shape the received light in a supplemental beam, wherein the supplemental beam becomes combined with and supplements the main beam to provide an overall beam pattern wherein the maximum intensity portion is equal to or less than the predetermined maximum intensity. This embodiment and these various components will now be described.

Figure 3:
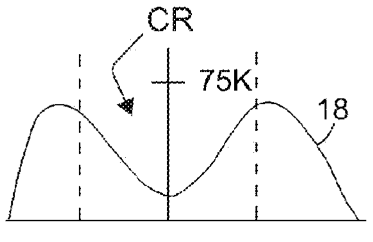
FIG. 3 is a sketch of the cross sectional intensity of one form of the invention.
Figure 4:
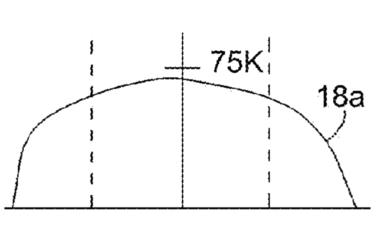
FIG. 4 is a sketch of the summation of the beams to FIGS. 2 and 3.

The concept is to augment the primary light distribution 14 in FIG. 2 by an auxiliary, supplementary or complementary light distribution 18 in FIG. 3 generated by a primary light source (such as source 72 in FIG. 8A described later herein) to produce the summation light distribution 18*a* shown in FIG. 4. It is noted that the distribution 18 in FIG. 3 produces limited light in the central region CR (FIG. 3), thus adding little or no significant intensity at the point P in FIG. 2 when the summation is done, thereby preventing the shift in excess of the allowed maximum indicated by curve 14*a* in FIG. 2.

Figure 5:
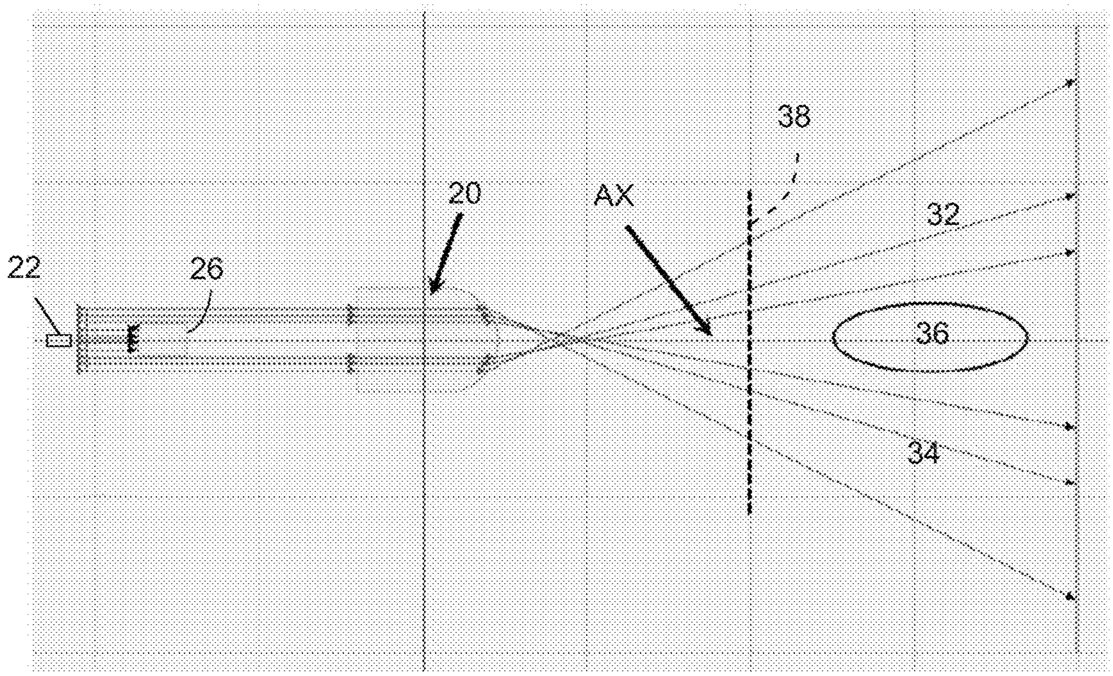
FIGS. 5, 6, 7 and 8 are plots produced by a public domain ray-tracing computer program, showing different patterns produced by different light sources.
Figure 5A:
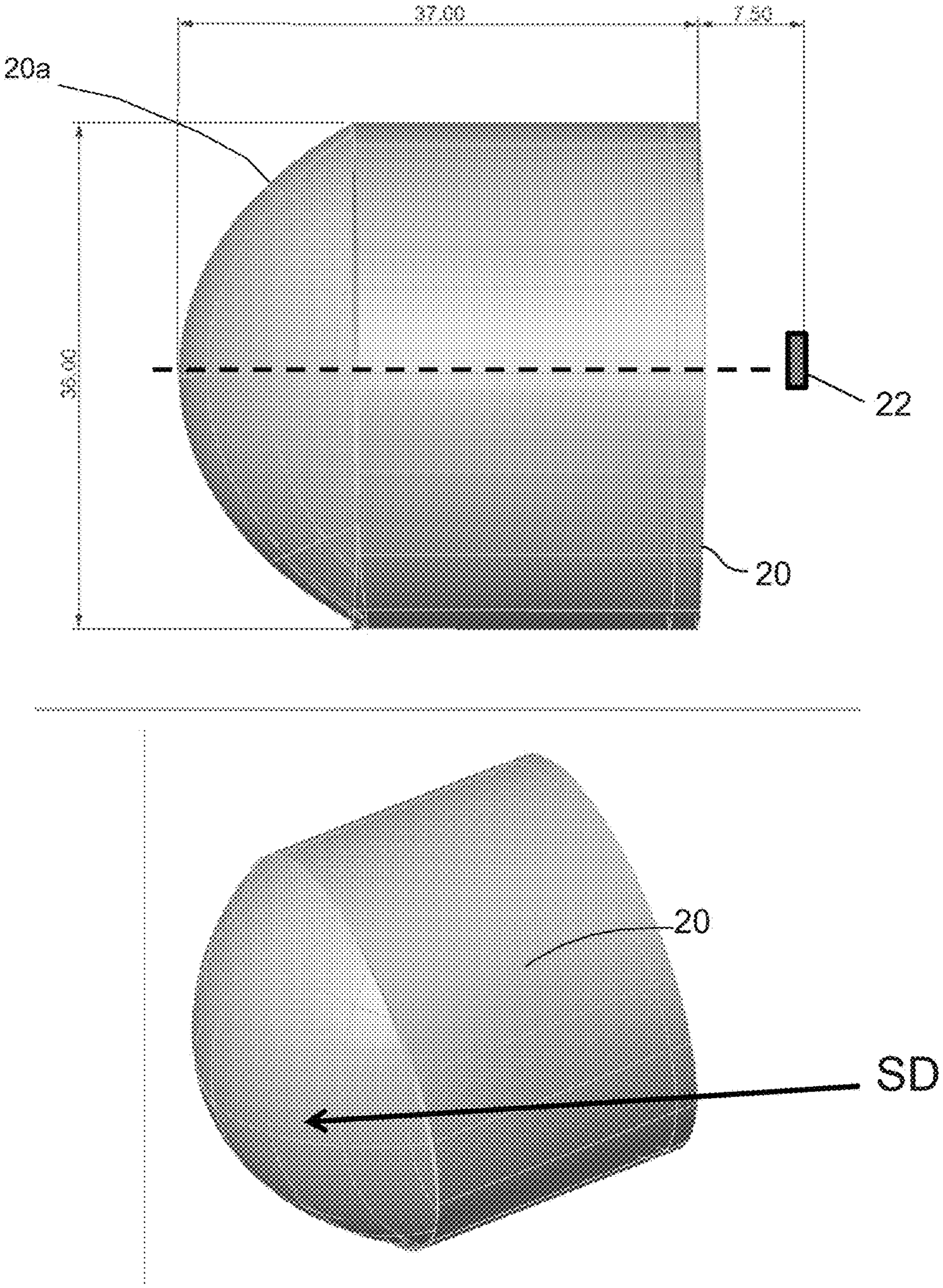
FIG. 5A shows one form of the invention.

FIG. 5A shows a plano-concave lens 20 with a diameter of at least about 37 millimeters (mm) and length of at least about 36 mm. The lens 20 has a convex surface 20*a* (FIG. 5A). At least one primary light source, such as light emitting diode (LED) 22, supplies light which is projected by the lens 20. Arrow SD in FIG. 5A shows an exit face of the lens 20 that is designed to split distribution. Power is defined as 1/f, wherein f is the focal distance of the lens. One type of LED is an Osram Oslon mono chip, producing 600 lumens. The lens 20 can be a one-piece integral and monolithic construction which may be constructed of a polymer material, such as Poly Methyl Meth—Acrylate (PMMA).

FIG. 5 illustrates one pattern of projected light generated by various combinations of LEDs 22 and lens 20. This patterns show a light source 24 of the line-source type, that is, a geometric line which projects light rays away from itself. In order to simulate discrete LEDs 22, one or more masks or shields 26, which function as an absorber or occluder, are used to block light in a generally central or main portion of the beam to provide two or more beam patterns, thereby simulating the use of two LEDs.

In FIG. 5, the lens 20 produces two beams 32 and 34 which diverge from each other, leaving a region 36 of low illumination between them. The cross-sectional distribution of these beams 32 and 34, at dashed line 38, will approximate the distribution 18 of FIG. 3. If the light beams 32 and 34 of FIG. 5 are added to the primary beam of FIGS. 1 and 2, then the desired distribution of FIG. 4 will be attained.

Figure 6:
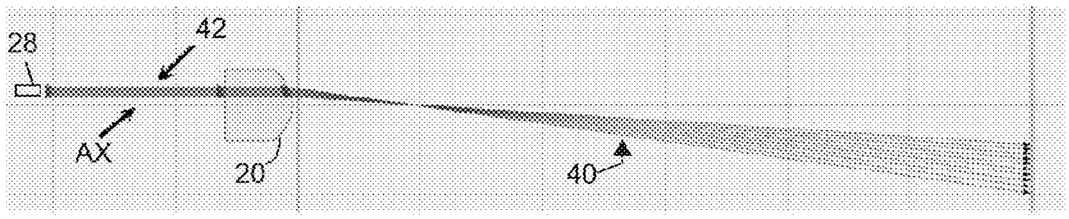

Several variations on the arrangement of FIG. 5 are possible. In FIG. 6, a single light source 28 is located laterally displaced from the optical axis AX of the lens 20. The projected beam 40 crosses the axis AX and diverges away from the axis AX. In FIG. 6, the incoming rays 42 are parallel to the axis AX. Although not shown, a light source may be added on the opposite side of the axis AX, then a mirror-image of the light beam shown will be added.

Figure 7:
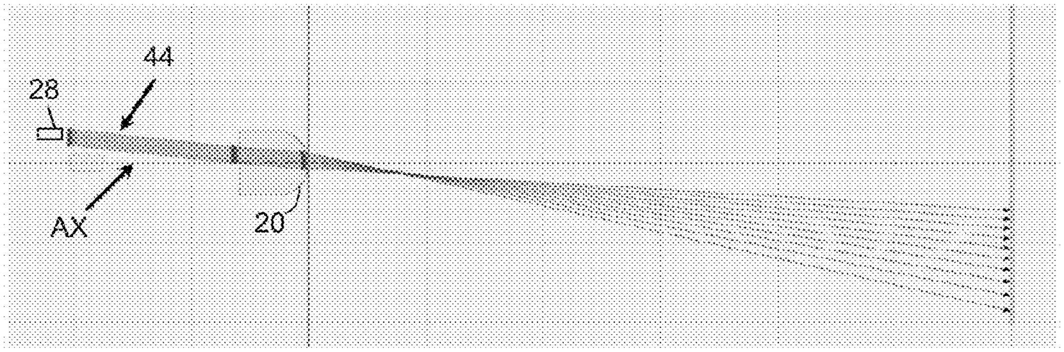

FIG. 7 is similar to FIG. 6, but in FIG. 7 the incoming light rays 44 are not parallel to the axis AX, but enter the lens 20 at roughly a ten degree angle with respect to the axis AX.

Figure 8:
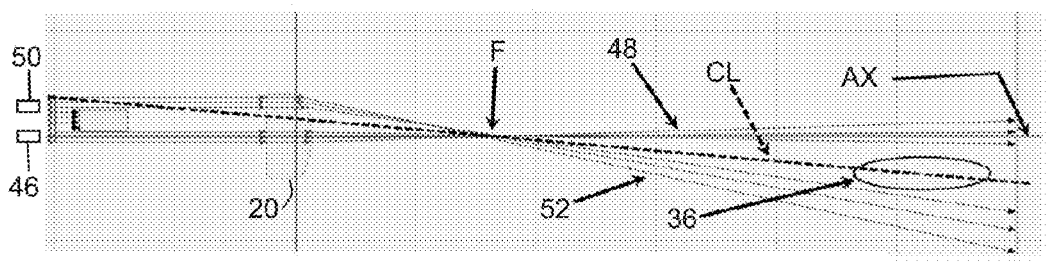

In FIG. 8, one light source 46 is on the optical axis AX of the lens, so that its projected beam 48 generally follows the axis AX. A second light source 50 is off-axis and generates a beam 52 which is skewed and diverges from beam 48. Both light sources 46 and 50 produce incoming beams which are parallel to the axis AX. The diverging beams 48 and 52 leave a region 36 of lesser illumination between them. Line CL is a bisector of projected beams 48 and 52.

The light distribution skew of FIG. 8 can be used as follows. Line CL in FIG. 8A originates in lamp A (FIG. 8A), which represents another embodiment of the invention. Line CL is parallel to a direction of movement of the vehicle 12. If the lens 20 in FIG. 8 (not shown in FIG. 8A) is aligned so that its bisector CL coincides with line CL in FIG. 8A, then the low light region 36 can be positioned on the line CL in FIG. 8A as desired. From another point of view, if the optical axis AX in FIG. 8 is aligned non-parallel with the bisector CL, then the low-light region 36 can be positioned on the bisector CL, since that region 36 is displaced laterally from the axis AX. In this particular example, the axis AX intersects the centerline CL at roughly the focus F of the lens 20.

Stated another way, the optical axis AX of the lens 20 in FIG. 8 may be rotated or pivoted in a horizontal plane and about the focus F, which intersects the bisector CL (FIG. 8). This type of alignment, where the optical axis AX of the lens 20 is not parallel with the bisector CL, can be important for styling purposes in cases where it is considered important that the lens 20 not face directly forward, for example.

Figure 8A:
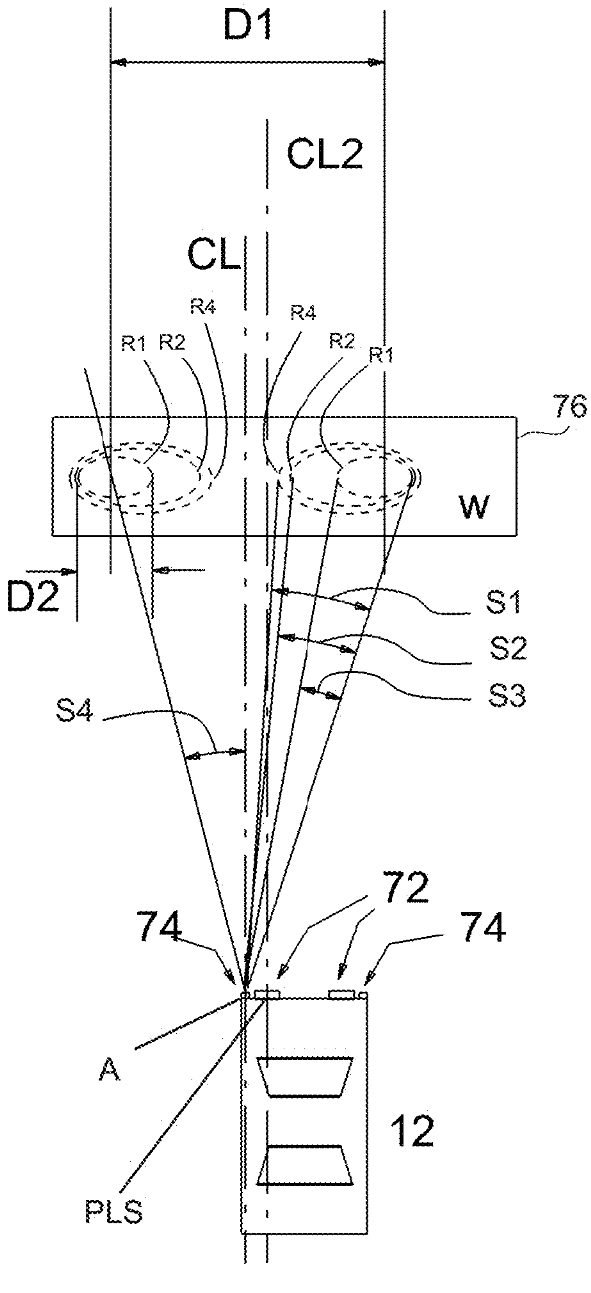
FIG. 8A shows angular relations between the beam cross-sections of FIG. 13 and the vehicle 6.

In one form of the invention, the auxiliary headlamp 74 in FIG. 8A is located adjacent the primary headlamp 72. The beam of the primary headlamp 72 follows generally line CL2. The primary headlamp 72 projects a primary beam which is adjustable between high and low beams, and possibly others. Such a beam may be, for example, a high beam or a low beam. The two beams produced by the auxiliary or complemented headlamp beam 74, which are represented by the two central intensity-spots or regions labeled R1 (and also labeled R1 in FIG. 13), flank or straddle the beam of the primary headlamp 72. One form of the invention includes both lamps 72 and 74 in FIG. 8A.

In FIG. 8A, the total divergence angle between the two spots or regions labeled R1 is about 10 degrees. Other angles may be used and angles between 5 degrees and 15 degrees are contemplated. The angle can also be stated as about ten degrees, plus or minus 20 percent, or about 8-12 degrees. In FIG. 8A, S1 shows a span of about 4-5 degrees, S2 is a span of about 2-4 degrees, S3 shows a span of about 1-2 degrees and S4 is a span of 5 degrees.

Figure 13:
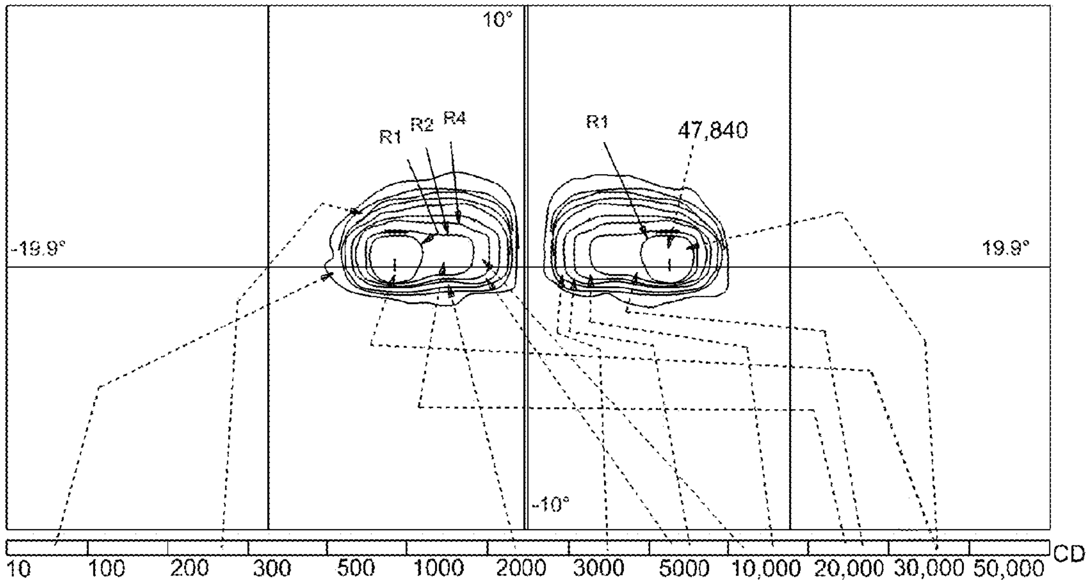
FIG. 13 is an approximate tracing of the cross-sectional intensity of one form of the invention.

In FIG. 8A, regions R1, R2 and R4 correspond to the regions of the same numbers in FIG. 13. The center of region R1 in FIG. 8A is located about 5 degrees left of the line CL, which originates at lamp 74 and is generally parallel to the centerline of the vehicle 12. Region R1 spans about 2 degrees (that is, left edge to right edge) region R2 spans about 4 degrees, and region R4 spans about 5 degrees.

It is to be noted that in FIG. 8A a pair of primary light sources or headlamp assemblies 72 is shown. Auxiliary lights 74, according to an embodiment of the invention are also shown. An imaginary wall 76 is shown in order to illustrate the cross sectional light distribution. In FIG. 8A, distance D1, the distance between centers of the two regions R1, and distance D2, the width of region R1, can be calculated using simple trigonometry. For example, if wall 76 is located 100 feet from the vehicle 12, then 100×TAN 5=(D1)/2 or D1=17.5 feet. Because D1 corresponds to 5 degrees and D2 corresponds roughly to 2 degrees, D2 will be about 40 percent of D1 (⅖=0.4), or roughly 7 feet in this illustrative example.

In one form of the invention, a complementary lighting device is provided comprising the lamp 74 in FIG. 8A which comprises four elements that are further illustrated in FIG. 25: (1) the plano convex lens 20 in FIG. 5, (2) a plurality of light sources 28 and 30, (3) a power supply 78, including input connectors (not shown) for the light sources 28 and 30, and (4) a bracket 80 (shown in dashed-line form for ease of illustration) for connecting items (1), (2) and (3) together. The two light sources 28 and 30 can include two or more LEDs, each with its own collimator, or a single LED with a beam splitter (FIG. 24C) or collimator, or the like. After manufacture and assembly of this device, it will be installed into a vehicle, as by bolting bracket 80 to the body of the vehicle 12. A gasket (not shown) and possibly cover lens (not shown) may be added to block entry of rain, snow and/or debris. In one form of the invention, no protective external lens is used and the convex shape of the lens 20 is exposed to the exterior. It should be understood that a plurality of light sources, such as LEDs 28, 30 and 70, may be used in combination with a plurality of lenses 20. The complementary lighting device could be situated in a headlamp, rear lamp or tail lamp housing or assembly with or without a cover lens as explained, although housing cover lens is typically preferred.

Figure 9:
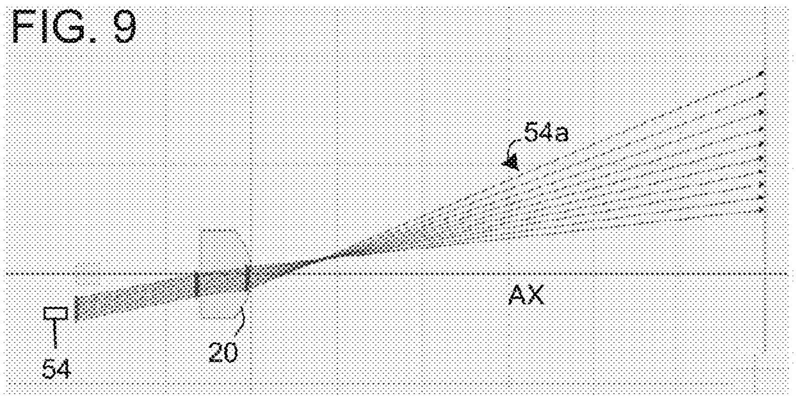
FIGS. 9 and 10 are plots produced by a public domain ray-tracing computer program, showing different patterns produced by different light sources.
Figure 10:
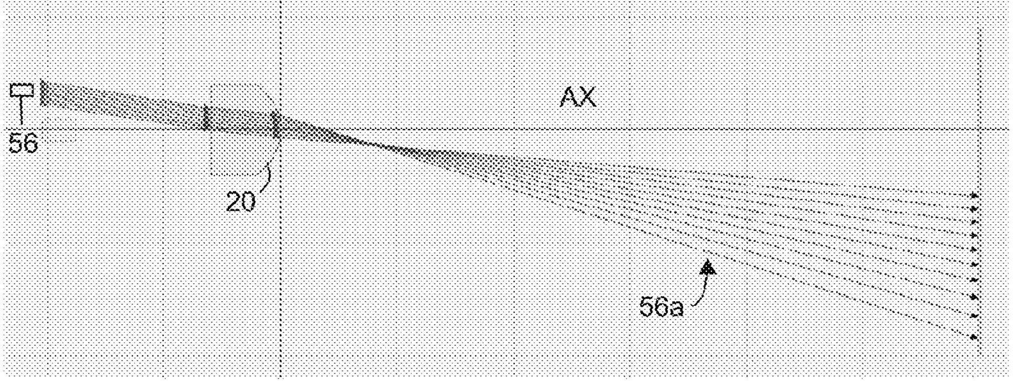

FIGS. 9 and 10 illustrate another embodiment where two light sources 54 and 56 are displaced from the axis AX laterally and they project beams 54*a* and 56*a*, respectively, which are non-parallel with the axis AX. If those two light sources 54 and 56 are superimposed on a single lens 20, then the diverging light beams of FIGS. 9 and 10 will emanate from that single lens 20 and produce the low-light region 36 illustrated generally in other Figures.

Figure 11:
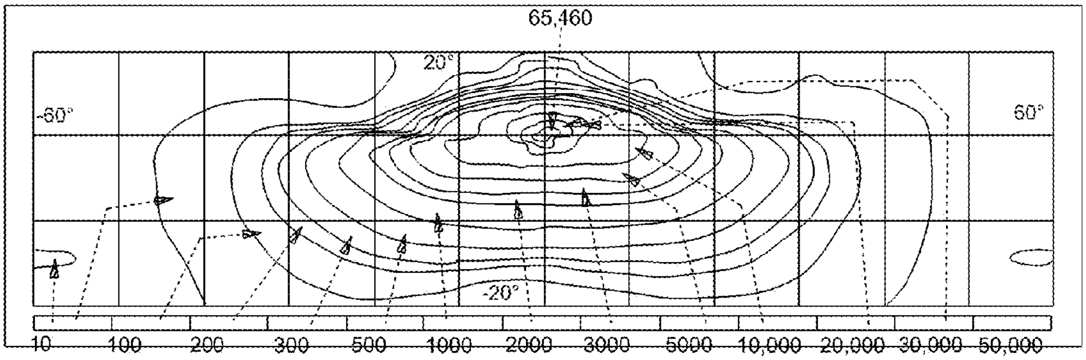
FIG. 11 is an approximate tracing of the cross-sectional intensity of an ordinary vehicle lighting device.

FIG. 11 is a cross sectional intensity distribution of an automotive headlamp having the lens 20 projected onto a wall located a distance of approximately 50 feet ahead of the headlamp. The intensity diminishes as distance increases from the central region, labeled 65,460, which can be rounded to 65,000. The numbers at the bottom represent relative intensity in units of candelas CDs.

FIG. 11 shows a maximum intensity of a headlamp of 65,460 candelas. That intensity can range from 30,0000 candelas to 300,000 candelas in various forms of the invention.

FIG. 13 shows a maximum intensity of the auxiliary headlamp of 47,840 candelas. That intensity can range from 30,0000 candelas to 300,000 candelas in various forms of the invention.

Figure 12:
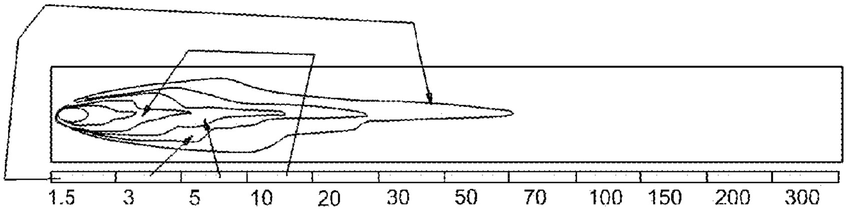
FIG. 12 is a plan view of the intensity pattern of the headlamp of FIG. 11.

FIG. 12 is a plan view on the beam distribution of FIG. 11. In concept, FIG. 12 is looking down at the beam of FIG. 11. In FIG. 12, the numbers again represent relative intensity.

FIG. 13 is similar to FIG. 11 and shows the cross-sectional intensity of one form of the present invention. It is noted that the near-circular regions R1 of intensity 30,000 CDs are separated from the central axis labeled 10 and minus 10. These regions correspond to, for example, the beams 32 and 34 of FIG. 5. In FIG. 13, the maximum intensity is approximately 47,840 CDs, which can be rounded to 47,000 candelas. Referring back to FIG. 13, the axes are measured in degrees, as is standard practice in the automotive industry. Regions R1, R2, and R4 represent intensities of 30,000, 20,000, and 10,000 candelas, respectively. The peak intensity is about 47,840 candelas as indicated. The two regions on opposite sides of the vertical axis are each about five degrees from the vertical axis, or about 10 degrees total from each other.

In one form of the invention, as FIG. 13 indicates, the auxiliary lamp 74 in FIG. 8A projects a spot of light of intensity of about 47,000 candelas. That spot is located forward of and 5 degrees to the left of lamp 74 in FIG. 8A. The projected light from lamp 74 does not augment, on line CL2, the light projected from lamp 72 above 75,000 candelas, despite the fact that the maximum intensity of the auxiliary lamp is 47,000 candelas, while that of the primary headlamp is 65,000 candelas, giving a ratio of 47/65, or 72 percent.

In more general terms, if the intensity of the primary beam is 65,000 candelas (in the specific example) and the intensity of the auxiliary beam is 47,000 candelas (in the specific example), the direct superposition of the primary beam plus the auxiliary beam would provide intensity of 65,000 candelas plus 47,000 candelas or about 112,000 candelas. But instead, the auxiliary beam is placed adjacent the primary beam to provide a summation which does not exceed 75,000 candelas. Of course, other thresholds can be selected if desired.

FIG. 14, top, is a rendition of the plan or bird's eye view of the beam distribution of FIG. 12. FIG. 14, bottom, is a composite in which the plan view of one embodiment of the pattern using lens 20 and light source 22 arranged as shown in FIG. 5 is superimposed onto the view of the top of FIG. 14. The lens 20 causes light to fill in the low-light regions 58 illustrated at the top of FIG. 14.

FIG. 15 shows the superposition of the top and bottom patterns shown in FIG. 14, bottom, but with the view of FIG. 14, top, indicated in phantom and labeled 14T. It should be understood that the top view in FIG. 14 and the phantom view in FIG. 15 indicate the primary beam projected by a primary headlamp or light source 72 (FIG. 8A). FIG. 14, bottom, is the complementary or supplementary beam created by use of the lens 20.

Figure 16:
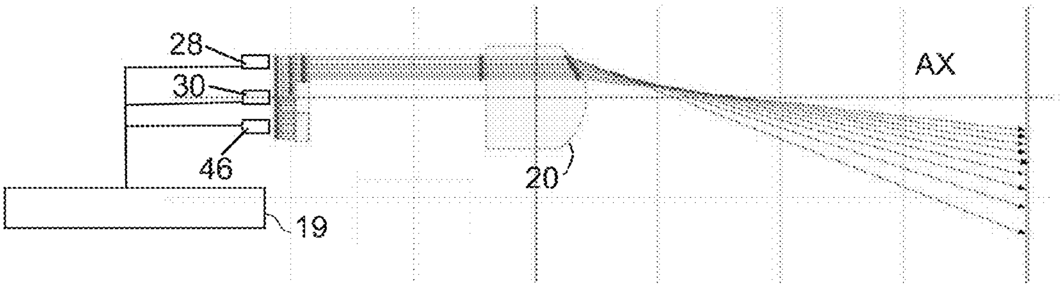

FIGS. 16-21 illustrate other embodiments showing a stack of three LEDs, 28, 30 and 46, all of which are covered by a power source (not shown) and coupled to and under control of a controller 19. In FIG. 16, LED 28, which is laterally displaced from the axis AX, is the only LED which is illuminated in the example. Its projected beam crosses the axis AX and diverges away from it, as indicated.

Figure 17:
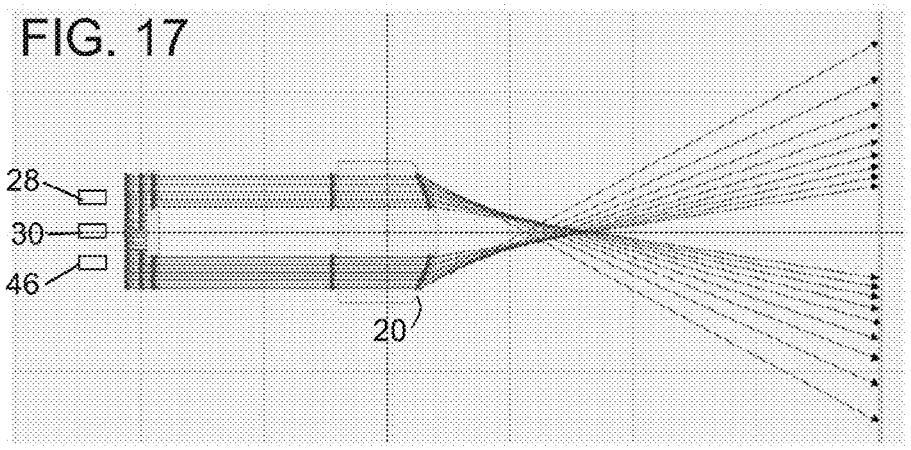

In FIG. 17, only LEDs 28 and 46 are illuminated. Their projected beams cross the axis AX, initially approaching each other, and they cross and diverge from each other as shown.

Figure 18:
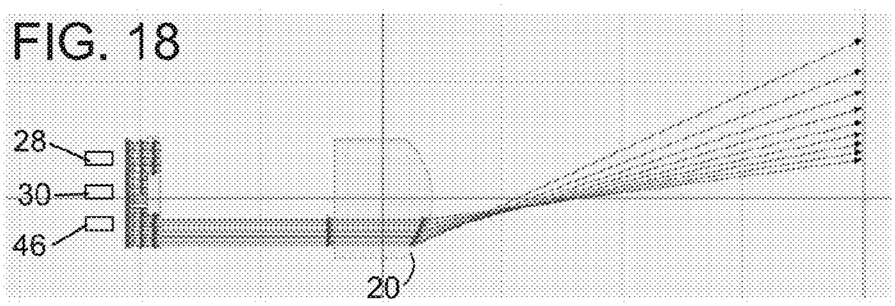

FIG. 18 is a mirror image of FIG. 16 showing only LED 46 illuminated.

Figure 19:
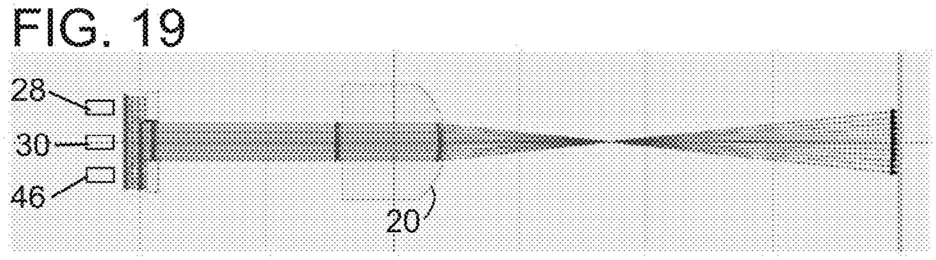

In FIG. 19, only LED 30 is illuminated, and it projects a central beam, which is diverging.

Figure 20:
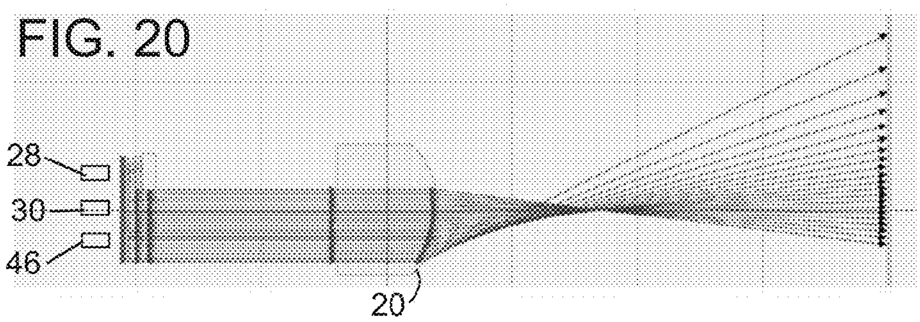

In FIG. 20, only LEDs 30 and 46 are illuminated. Their beams, like that of FIG. 17, cross the axis and then diverge from it.

Figure 21:
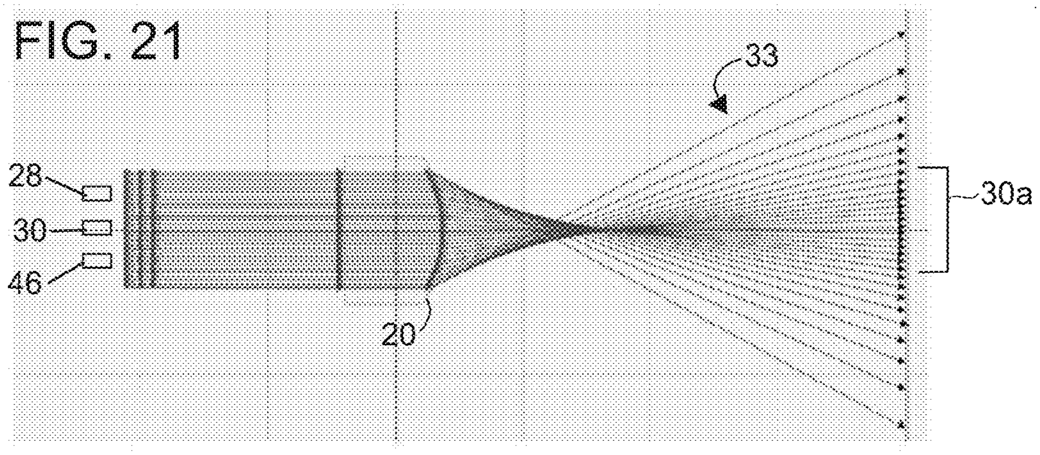

In FIG. 21, all three LEDs 28, 30 and 46 are illuminated. As in FIG. 19, the beam follows the axis, but diverges. Unlike the embodiments of FIG. 5, there is no mask or shield 26 in this embodiment for ease of illustration so the light from LED 30 provides light to a central portion 30*a* of the beam 33. There may be instances where it is desired to have the light in region 30*a* (FIG. 21) generated by LED 30, such as when a control portion of the primary beam needs to be supplemented.

The three LEDs 28, 30 and 46 are selectively energizeable and actuable independently of each other. The LEDs 28, 30 and 46 are shown as projecting parallel beams, which may be rendered parallel by a collimator (not shown). The beams projected by the LEDs 28, 30 and 46 are shown parallel to the axis AX. However, some of the LEDs 28, 30 and 46 may project beams that are not parallel to the axis, as in FIGS. 9 and 10 for example.

FIG. 22 shows a plano-concave lens 60, which also produces at least two diverging beams with a low-light area 36 between them. However, the concave surface of lens 60 is not optimal for use in motor vehicles from the viewpoint of styling and aerodynamics and may also collect road dirt or debris because the concavity may tend to shield the lens 60 from the cleansing effects of rainwater.

FIG. 23 shows that the lateral displacement of at least one or a plurality of LEDs from the axis cannot be an arbitrarily selected distance. For example, ray LR1 enters the lens 20, but is reflected internally as ray LR2, instead of being transmitted. Then ray LR2 is reflected as ray LR3, which exits the lens 20 in the rearward direction (as viewed in FIG. 23) It should be understood that the refraction occurring at the horizontal edge 20*b* of the lens 20 at point P3 is not shown to scale. These events occur because the angle of incidence where ray R1 strikes the convex surface of the lens 20, at point P4, has reached or is greater than the critical angle and total internal reflection occurs, rather than transmission through the convex surface. Reduction in the curvature of the lens 20 can reduce this reflection, as can placing ray R1 closer to the axis AX or a combination of these two expedients.

FIGS. 24A-24D shows three variations in creating the diverging beams A and B. A single light source 62 produces a single beam which travels off-axis, as in FIG. 6 or 7. A mirror-image pair of these lights will create the pair of spots A and B in FIG. 24D. A pair of light sources 64 and 66 (FIG. 24B), laterally displaced from each other, together with their collimators 68, produce the two diverging beams.

Figure 24A:
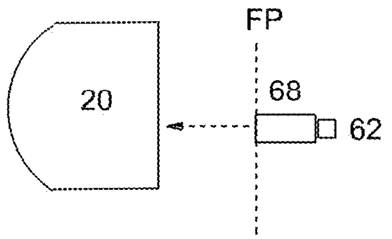
Figure 24C:
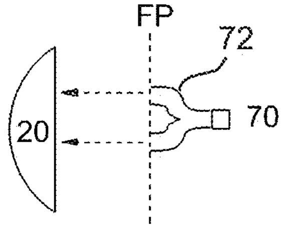
Figure 24B:
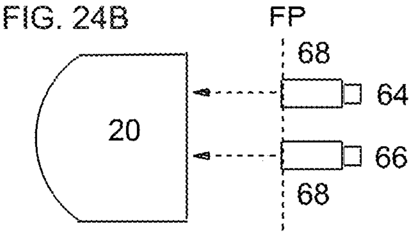
Figure 24D:
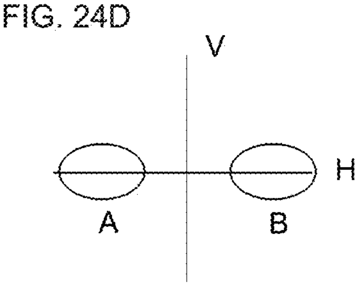

In FIG. 24C, a single light source 70 is coupled to a beam splitter or light guide 72 to create the two beams A and B (FIG. 24D). The beam splitter or light guide 72 can take the form of a Y-coupler of bundled fibers, as known in the art.

FIG. 26 illustrates a headlamp found in the prior art to illustrate another feature of another embodiment with a lens L. Filament F1 is located at a focus of the reflector R. Filament F2 is located axially forward, radially above, and leftward of filament F1. This location of filament F2 causes the projected beam to be projected beam to be downward and rightward.

In contrast, under one form of the invention, no LEDs, such as LEDs 64 and 66, are located at a focus, although they can be located in a focal plane FP in the diameter D as shown in FIG. 27. Further, in the prior art embodiment of FIG. 26, the filament F1 is located on the optical axis AX1 of the lamp. In one form of the invention, neither LED 64 nor LED 22 is located on the optical axis. Further still, the prior art lens in FIG. 26 is not actually used as a lens for the purpose of focusing, but more as protection from weather. In one embodiment, this part is eliminated by the one-piece lens 20.

In one form of the invention, the light sources 64 and 66 in FIG. 27 are located adjacent a horizontal diameter of the lens 20 and not on a chord of the lens 20, but are spaced from the lens 20, as in FIG. 24B.

FIG. 28 illustrates one type of beam splitter 82, which can be a solid polymer body or object or bundle of optical fibers. Significantly, there is an elongated V-cavity 84 which carries no light. FIG. 29 shows a plan view and side view of the beam splitter 82 in use. The beam cross section produced is shown in FIG. 30.

Region 86 (FIG. 30) is dark or of lesser illumination because of the V-cavity 84 in FIG. 28. Region 88 may coincide with the optical axis OA in FIG. 29, which will be near axis CL2 in FIG. 8A. However, since region 88 in FIG. 30 is displaced from the axis OA in FIG. 29, region 88 will be of lesser intensity and will not add significantly to the intensity of the primary headlamp 72 in FIG. 8A, which will not thereby exceed the intensity limit. From another point of view, the intensity of region 88 is better represented by the region R4 in FIG. 13 or another region of lesser intensity which is of lower intensity than the region R1.

It is pointed out that in the side view at the top of FIG. 29, the beam splitter 82 and light source 90 is located below the axis OA. However, because of the properties of the lens 20, the projected beam will lie on the opposite side of the axis OA, analogous to FIGS. 6 and 7. Thus, the plot of FIG. 30 will lie above the X-axis, which represents the horizon, even though the beam splitter 82 in FIG. 29 lies below the axis OA as shown in the plan view at the bottom of FIG. 29. A similar comment applies to the top view of FIG. 29.

FIGS. 31A-35 illustrate another embodiment of a lens 200. In this embodiment, the lens 200 (FIG. 31A) has an exit face 200*a* having a plurality of lobes or convex surfaces 200*b* and 200*c*. The exit face 200*a* of the lens 200 is not spherical and thus not axi-symmetric. An ordinary plano-convex lens is axi-symmetric. Instead, the exit face 200*a* comprises two or more faces or lobes of the same or different curvature. For example, FIGS. 31A and 31C illustrate the lens 200 having two exit faces 200*b*, 200*c* with face 200*c* horizontally displaced to the side of face 200*b*. The lens 200 has an entry face 200*d* that receives light from at least one or a plurality of LEDs. In one embodiment, the exit faces 200*b* and 200*c* are of different curvature and thus behave as lenses of different focal lengths. In this embodiment, the exit faces 200*b*, 200*c* may be symmetrical about a medial line ML.

FIG. 31C illustrates two exit faces 200*b* and 200*c*, but with face 200*b* shaded. The shading can represent the fact that face 200*b* is colored and can thus tint or color the projected light. For example, the face light may be tinted in an amber color. Exit face 200*c* in FIG. 31C can optionally be tinted similarly.

FIG. 31B illustrates another embodiment of a lens 300 with an exit face 300*a* having a plurality of lobes or faces 300*a* and 300*b* with face 300*a* displaced vertically above face 300*b*. In this embodiment, the lens 300 can be used with a pair of light sources, but positioned vertically, one above the other. One light source produces a beam which is cast downward (instead of leftward, as described above), and is a low-brightness beam. The other beam is cast upward (instead of rightward, as above) and is a high beam.

The different faces 200*b*, 200*c*, 300*a* and 300*b*, for example, need not be spherical sections, but can assume other curvatures or shapes, such as hyperbolic. They can also be faceted, analogous to an insect's eye, in which flat transmissive facets are aligned along a curve of the appropriate shape.

FIG. 33 illustrates the type of cross sectional intensity pattern produced by the dual exit faces of FIG. 31A. In FIG. 33, the horizontal and vertical axes represent angular displacement, rather than linear displacement as used in ordinary Cartesian coordinates. Two dashed vertical lines are shown at positive 20 degrees and negative 20 degrees. It is seen that the central spots CS of the two images are not symmetrical with respect to the two 20-degree-lines, consistent with the different exit faces used to project the two central spots CS. FIG. 32 illustrates this consistency. Beam region A, on the left side in FIG. 32, is produced by exit face 200*c*. Beam region B is produced by exit face 200*b*.

In one form of the invention, a single light source, namely the LED in FIG. 32, is split into two beams as illustrated in FIG. 32, because region A has a different focal length than region B. In FIG. 32, a region C of reduced illumination is located between the two beams, analogous to region CR in FIG. 3. The optical axis is labeled OA in FIG. 32.

In several of the embodiments described, no additional optical components are present in the light path between the exit faces and the light source(s), for example, in FIGS. 31A-31C. Mounting brackets and power supplies may be present, for example, but they are not within the light path and do not perform a focusing function. A protective transparent shield or lens (not shown) may be present to protect against weather, dirt and/or debris.

Advantageously, the embodiments shown provide a complementary, auxiliary or supplemental lighting system that permits or enables the enhancement of portions of a beam while not exceeding the regulatory limits established by regulatory authorities.

This invention, including all embodiments shown and described herein, could be used alone or together and/or in combination with one or more of the features covered by one or more of the claims set forth herein, including but not limited to one or more of the features or steps mentioned in the bullet list in the Summary of the Invention and the Claims.

While the system, apparatus and method herein described constitute preferred embodiments of this invention, it is to be understood that the invention is not limited to this precise system, apparatus and method, and that changes may be made therein without departing from the scope of the invention which is defined in the appended claims.

What is claimed is:

1. A vehicle lighting device configured to project a main beam having a maximum intensity portion, said maximum intensity portion having a predetermined maximum intensity, said vehicle lighting device comprising:

at least one supplemental lighting system comprising:

at least one light source, and at least one shaping lens configured to receive light from said at least one light source and to shape said received light in a supplemental beam;

wherein said supplemental beam is simultaneously projected and combined with said main beam to provide an overall beam pattern wherein said maximum intensity portion is equal to or less than said predetermined maximum intensity, and wherein an exit surface of said at least one shaping lens comprises multiple lobes.

2. The vehicle lighting device as recited in claim 1, wherein said multiple lobes comprises a first generally convex surface and a second generally convex surface, wherein said first and second generally convex surfaces are convex relative to at least one entry surface of said at least one shaping lens that receives said received light.

3. The vehicle lighting device as recited in claim 2, wherein said first and second generally convex surfaces are symmetrical about a medial line.

4. The vehicle lighting device as recited in claim 1, wherein said at least one light source and said at least one lens cooperate to generate said supplemental beam having at least two diverging beams that straddle said maximum intensity portion of said main beam and that do not augment a predetermined area of said main beam.

5. The vehicle lighting device as recited in claim 4, wherein said maximum intensity of each of said at least two diverging beams does not exceed 75 percent of a maximum intensity of said main beam.

6. The vehicle lighting device as recited in claim 4, wherein said at least two diverging beams diverge at an angle of between about 8-12 degrees.

7. The vehicle lighting device as recited in claim 4, wherein said at least one light source comprises an LED and a beam splitter or light guide that generates said at least two diverging beams.

8. The vehicle lighting device as recited in claim 4, wherein said at least one light source comprises a plurality of LEDs.

9. The vehicle lighting device as recited in claim 1, in which said lens is an integral monolithic construction.

10. The vehicle lighting device according to claim 4, in which the at least one lens has a plurality of exit faces of different focal lengths through which the at least two diverging beams pass.

11. The vehicle lighting device according to claim 1, in which the at least one lens has a convex face having a plurality of exit regions or lobes of different curvatures or focal lengths through which the two diverging beams pass.

12. The vehicle lighting device according to claim 1, wherein said at least one lens has a convex face having at least a first curvature and a second curvature that are symmetrical about a medial line.

13. A lens for use in a vehicle lighting device, said lens, comprising:

a lens body; and said lens body having an entry face and at least one convex exit face that is convex with respect to said entry face, said entry face is arranged to receive light from at least one light source and to generate a plurality of beams through said at least one convex face, wherein the at least one convex exit face comprises a plurality of exit faces of different focal lengths for generating at least one supplemental beam pattern for supplementing a separate beam pattern.

14. The lens according to claim 13, in which the at least one convex exit face comprises a plurality of convex regions, lobes or curvatures for generating a plurality of beam patterns.

15. The lens according to claim 13, wherein said at least one convex exit face has a first curvature and a second curvature that are symmetrical about a medial line.

16. The lens as recited in claim 14, wherein said plurality of convex regions, lobes or curvatures comprise a first generally convex surface and a second generally convex surface that is adjacent to said first generally convex surface.

17. The lens as recited in claim 16, wherein said first and second convex surfaces are symmetrical about a medial line that generally coincides with an axis of said lens.

* * * * *